United States Patent
Giroux

(10) Patent No.: US 9,405,561 B2
(45) Date of Patent: Aug. 2, 2016

(54) METHOD AND SYSTEM FOR MEMORY OVERLAYS FOR PORTABLE FUNCTION POINTERS

(75) Inventor: Olivier Giroux, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 25 days.

(21) Appl. No.: 13/570,155

(22) Filed: Aug. 8, 2012

(65) Prior Publication Data

US 2014/0047213 A1   Feb. 13, 2014

(51) Int. Cl.
G06F 9/30 (2006.01)
G06F 9/38 (2006.01)
G06F 9/445 (2006.01)
G06F 9/44 (2006.01)

(52) U.S. Cl.
CPC ............ *G06F 9/44547* (2013.01); *G06F 9/443* (2013.01); *G06F 2209/463* (2013.01)

(58) Field of Classification Search
CPC .......... G06F 15/16; G06F 16/167; G06T 1/20
USPC ................................................. 712/200, 228
See application file for complete search history.

(56) References Cited

U.S. PATENT DOCUMENTS

| | | | |
|---|---|---|---|
| 5,440,705 A | 8/1995 | Wang et al. | |
| 6,266,736 B1 | 7/2001 | Atkinson et al. | |
| 6,684,305 B1 * | 1/2004 | Deneau | 711/159 |
| 6,952,825 B1 | 10/2005 | Cockx et al. | |
| 7,337,300 B2 | 2/2008 | Fronte et al. | |
| 8,276,132 B1 * | 9/2012 | Vanderspek et al. | 717/149 |
| 8,531,471 B2 * | 9/2013 | Chen et al. | 345/542 |
| 8,539,164 B2 * | 9/2013 | Warner et al. | 711/141 |
| 2004/0207630 A1 | 10/2004 | Moreton et al. | |
| 2005/0080998 A1 * | 4/2005 | Day et al. | 711/141 |
| 2009/0055596 A1 * | 2/2009 | Wallach et al. | 711/141 |
| 2011/0078358 A1 | 3/2011 | Shebanow | |
| 2012/0254497 A1 * | 10/2012 | Ni et al. | 711/6 |
| 2013/0061240 A1 * | 3/2013 | Yan et al. | 719/312 |
| 2013/0173894 A1 * | 7/2013 | Yan et al. | 712/228 |

\* cited by examiner

*Primary Examiner* — Adam M Queler
*Assistant Examiner* — Edmund Kwong

(57) ABSTRACT

A system and method for implementing memory overlays for portable pointer variables. The method includes providing a program executable by a heterogeneous processing system comprising a plurality of a processors running a plurality of instruction set architectures (ISAs). The method also includes providing a plurality of processor specific functions associated with a function pointer in the program. The method includes executing the program by a first processor. The method includes dereferencing the function pointer by mapping the function pointer to a corresponding processor specific feature based on which processor in the plurality of processors is executing the program.

20 Claims, 9 Drawing Sheets

METHOD AND SYSTEM FOR MEMORY OVERLAYS FOR PORTABLE FUNCTION POINTERS

BACKGROUND

A heterogeneous computer system comprises two or more processors. Processors in the system may implement architectures that are different from each other. In particular, each of the processors may have instruction set architectures (ISAs) that are different. In the heterogeneous computer system, a single program or application may be executed by one or more processors of the heterogeneous computer system.

However, a function that is instantiated once within the program may be not be executable by different processors. That is, a function that is instantiated within the program may be compatible with one ISA of a first processor, but is not compatible with another ISA of a second processor. As such, depending on which processor is executing parts of the program at a particular time, the function may or may not be executable.

Some programming languages expose the relation between functions and their instantiations to programmers. Many languages treat functions as objects that can be stored, retrieved and subsequently called. Those languages which further guarantee constant algorithmic time for these operations have standardized in norm or in practice that programs may assert the existence of a unique bidirectional relation between function and function instances. Heterogeneous systems break these assumptions by creating a non-unique relation between functions and function instances.

In particular, the International Organization for Standardization (ISO) C and C++ languages mandate that each function (that is one definition rule (ODR) based, see ISO-9899 and ISO-14882) have a unique instantiation, with a unique address for accessing. The programming languages further state that the address of the function may be taken (e.g., with the "&" operator) and stored in a variable of a suitable function pointer type. As such, the function associated with the function pointer variable may then be stored in memory for later access. In the case of a heterogeneous system, the function that is called within a program must be executable by any or all of the processors capable of accessing the pointer.

A problem is encountered when an incompatible processor is executing the function. Typically, the function that is stored in the address taken within the function pointer variable is compiled for a particular processor. Though the source code may be written in a manner that is compatible with all the processors, at the machine or assembly level, the function stored may only be compatible with one ISA of a corresponding processor. As such, when the function pointer is dereferenced (e.g., using the "*" operator), the function whose address was stored within the function pointer variable is called. This behavior is mandated, even if different processors execute the "&" and "*" operators. However, if the function is not compiled for the processor calling the function, then that processor will not be able to execute the function. As a result, the program will fail.

It is desirous to have a heterogeneous computer system be able to execute a function across all ISAs of processors included within the system.

SUMMARY

In embodiments of the present invention, a computer implemented method for implementing memory overlays for program handles is described. The computer implemented method includes providing a program executable by a heterogeneous processing system comprising a plurality of a processors running a plurality of instruction set architectures (ISAs). The method also includes providing a plurality of processor specific features, each of which is associated with a handle in the program. The method also includes mapping a corresponding processor specific feature to the handle based on which processor is executing the program.

In another embodiment, a computer implemented method for implementing code memory overlays for portable pointer variables is described. The computer implemented method provides for a pointer variable having a unique address in virtual memory, wherein the address is translatable to different executable objects corresponding to each ISA of processors in a heterogeneous computer system executing the program including the pointer variable. In particular, the method for program execution includes providing a program that is executable by a heterogeneous processing system comprising a plurality of processors running a plurality of ISAs. The method includes executing the program by a first processor, wherein the first processor is associated with a corresponding ISA. The method further includes calling through or dereferencing a pointer variable in the program. Furthermore, translating the virtual memory address that is stored in the pointer variable to a physical address is performed. The virtual memory address is universal across a plurality of virtual memories associated with the plurality of processors. The method also includes accessing a first physical memory address that corresponds to the virtual memory address in relation to the first processor, and a different physical memory address in relation to other processors.

In another embodiment, a heterogeneous processing system is disclosed, wherein the heterogeneous processing system is configured for implementing memory overlays for portable pointer variables. The system includes physical memory that is controlled by a memory controller. The system also includes a plurality of processors, each configured to execute a program. The plurality of processors run a plurality of instruction set architectures (ISAs). For instance, each processor runs a different ISA. Also, a plurality of virtual memories corresponding to the plurality of processors is included. Each virtual memory maps to the physical memory for a corresponding processor. A pointer variable in the program includes a virtual memory location in the virtual memory that is universal to the plurality of processors. A plurality of page tables is included, wherein the page tables are used for mapping the virtual memory location to a plurality of physical memory locations in the physical memory depending on which processor is referencing the virtual memory location. Each page table corresponds to a different processor.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "providing," "executing," "calling," "translating," "accessing," or the like, refer to actions and processes (e.g., flowchart 400 of FIG. 4) of a computer system or similar electronic computing device or processor (e.g., system 100 and 200 of FIGS. 1 and 2, respectively). The computer system or similar electronic computing device manipulates and transforms data represented as physical (electronic) quantities within the computer system memories, registers or other such information storage, transmission or display devices.

Figure 4:
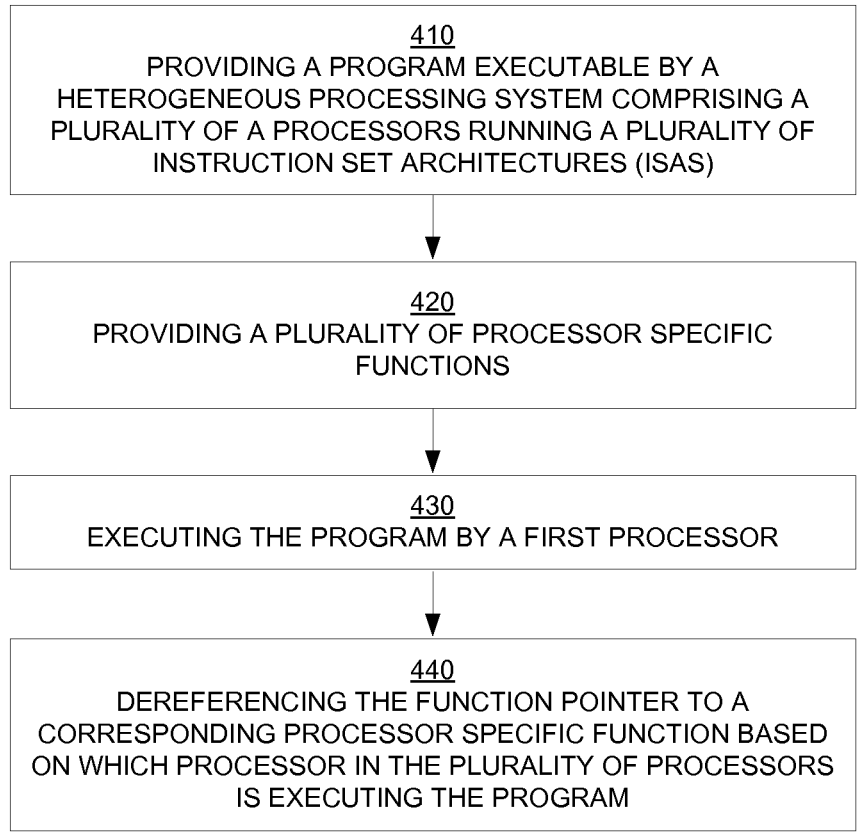
FIG. 4 is a flow diagram illustrating a method for program execution that is capable of implementing code memory overlays for a portable pointer variable that has a unique address in a plurality of virtual memories of a heterogeneous processing system, such that the address is translatable to different executable objects corresponding to each ISA of processors in the heterogeneous computer system executing the program including the pointer variable, in accordance with one embodiment of the present disclosure.

FIG. 4 is a flowchart of examples of computer-implemented methods for processing data according to embodiments of the present invention. Although specific steps are disclosed in the flowcharts, such steps are exemplary. That is, embodiments of the present invention are well-suited to performing various other steps or variations of the steps recited in the flowcharts.

Other embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

Figure 1:
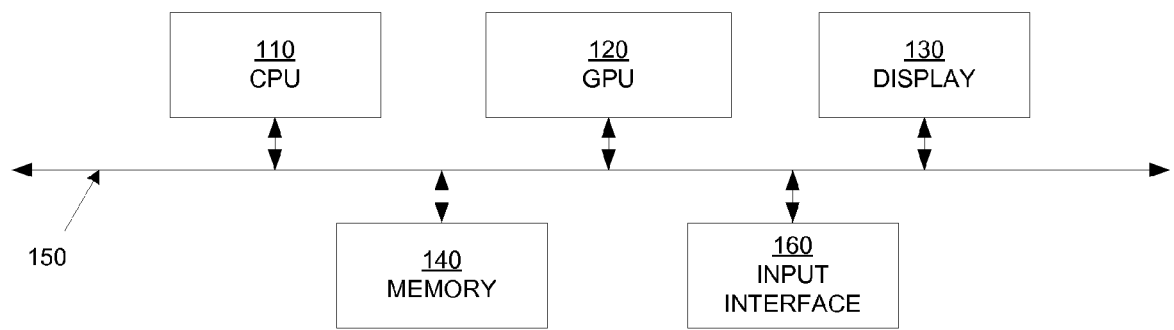
FIG. 1 depicts a block diagram of an exemplary computer system suitable for implementing the present methods, in accordance with one embodiment of the present disclosure.

FIG. 1 is a block diagram of an example of a computing system 100 capable of implementing embodiments of the present disclosure. Computing system 100 broadly represents any single or multi-processor computing device or system capable of executing computer-readable instructions. Examples of computing system 100 include, without limitation, workstations, laptops, client-side terminals, servers, distributed computing systems, handheld devices, or any other computing system or device. In its most basic configuration, computing system 100 may include at least one processor 110 and a system memory 140.

Both the central processing unit (CPU) 110 and the graphics processing unit (GPU) 120 are coupled to memory 140. System memory 140 generally represents any type or form of volatile or non-volatile storage device or medium capable of storing data and/or other computer-readable instructions. Examples of system memory 140 include, without limitation, RAM, ROM, flash memory, or any other suitable memory device. In the example of FIG. 1, memory 140 is a shared memory, whereby the memory stores instructions and data for both the CPU 110 and the GPU 120. Alternatively, there may be separate memories dedicated to the CPU 110 and the GPU 120, respectively. The memory can include a frame buffer for storing pixel data that drives a display screen 130.

The system 100 includes a user interface 160 that, in one implementation, includes an on-screen cursor control device. The user interface may include a keyboard, a mouse, and/or a touch screen device (a touchpad).

CPU 110 and/or GPU 120 generally represent any type or form of processing unit capable of processing data or interpreting and executing instructions. In certain embodiments, processors 110 and/or 120 may receive instructions from a software application or hardware module. These instructions may cause processors 110 and/or 120 to perform the functions of one or more of the example embodiments described and/or illustrated herein. For example, processors 110 and/or 120 may perform and/or be a means for performing, either alone or in combination with other elements, one or more of the monitoring, determining, gating, and detecting, or the like described herein. Processors 110 and/or 120 may also perform and/or be a means for performing any other steps, methods, or processes described and/or illustrated herein.

In some embodiments, the computer-readable medium containing a computer program may be loaded into computing system 100. All or a portion of the computer program stored on the computer-readable medium may then be stored in system memory 140 and/or various portions of storage devices. When executed by processors 110 and/or 120, a computer program loaded into computing system 100 may cause processor 110 and/or 120 to perform and/or be a means for performing the functions of the example embodiments described and/or illustrated herein. Additionally or alternatively, the example embodiments described and/or illustrated herein may be implemented in firmware and/or hardware.

Figure 2:
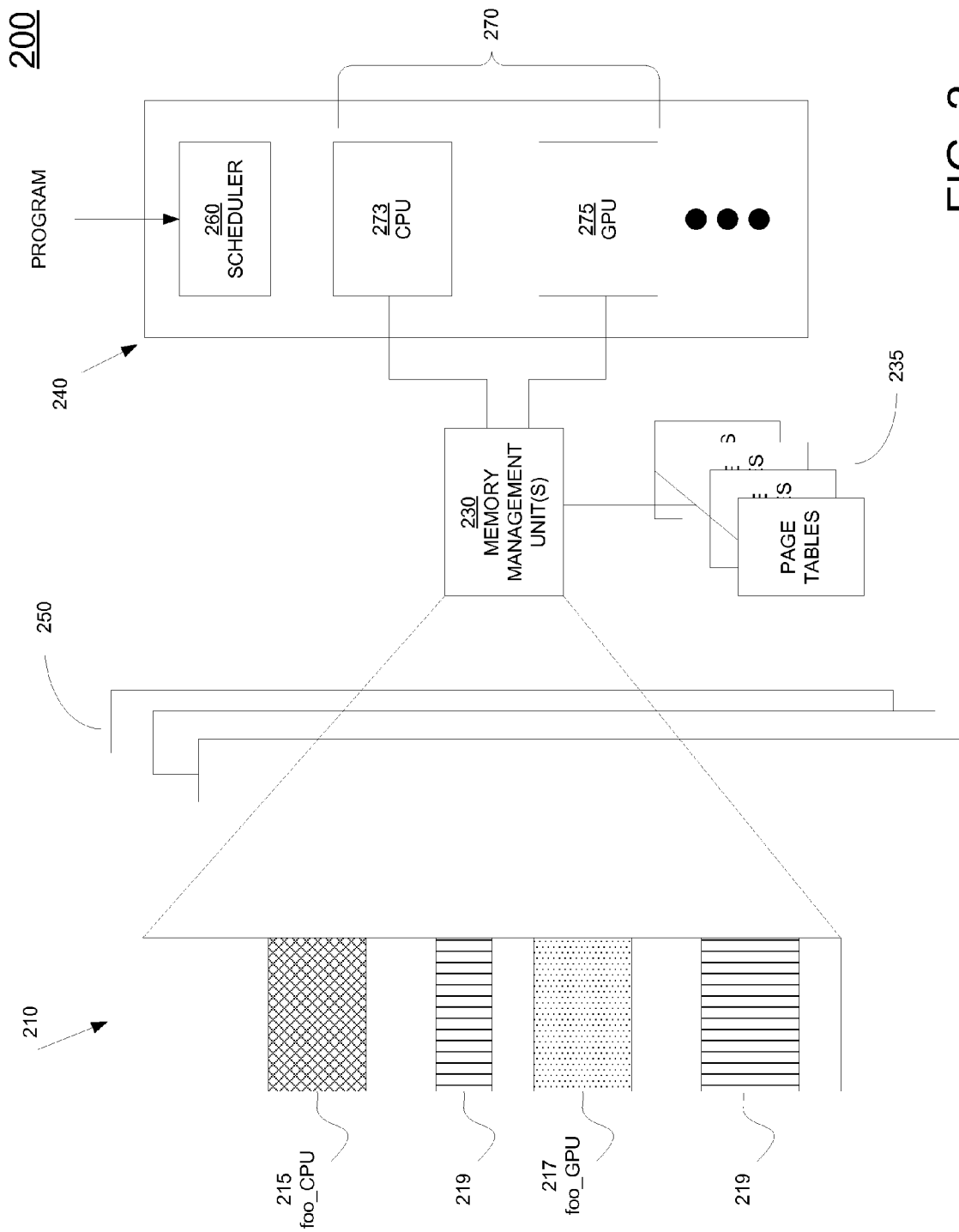
FIG. 2 is a block diagram of an exemplary heterogeneous computer system configured for implementing memory overlays for portable pointer variables, in accordance with one embodiment of the present disclosure.

FIG. 2 is a block diagram of an exemplary heterogeneous computer system 200 configured for implementing code memory overlays for portable handles (e.g., function pointers), in accordance with one embodiment of the present disclosure. System 200 is implementable within computer system 100 of FIG. 1 in one embodiment for purposes of executing a program including a handle associated with a unique address in a plurality of virtual memories, wherein the address is translatable to different executable objects corresponding to each ISA of processors in the heterogeneous computer system 200.

As shown in FIG. 2, the heterogeneous computer system includes a core configuration 240 that comprises one or more components used for executing program instructions. For instance, core 240 includes a plurality of processors 270. Processors can include a central processing unit (CPU) 273, graphics processing unit (GPU) 275, general-purpose processor (GPP), special-purpose processor (e.g., digital signal processor, video editing processor, etc.), application specific integrated circuit (ASIC), field programmable gate array (FPGA), etc. In addition, core configuration 240 includes a cache memory (not shown) that is used by the various processing units for local storage of data and instructions. More particularly, cache memory stores copies of data and instructions found in the main memory 210 of the heterogeneous computing system 200.

More particularly, each of the processors in the core 240 is configured as having a Von Neumann architecture, which includes having both data and instructions stored in memory. In addition, each of the processors run different ISAs, which may lead to binary incompatibility. In general, an ISA includes a set of opcodes (e.g., machine language instructions) and the native commands implemented by a particular processor. That is, a function called by a first processor is executed at a machine level using a first set of ISAs, whereas the same function called by a second processor is executed at a machine level using a second set of ISAs. Embodiments of the present invention provide for proper execution of a call through a handle (e.g., function pointer or pointer variable) regardless of which processor is used for accessing function or data associated with the call. Other embodiments of the present invention provide for proper access of processor specific data through a handle regardless of which processor is used for accessing the data. Still other embodiments provide for proper access of processor specific objects through the handle.

The core 240 also includes a scheduler 260 that is configured to manage access to system resources, to include components of the core configuration 240 (e.g., cache, processors including CPU 273 and GPU 275), and other components found within system 200. For instance, scheduler 260 schedules operating system tasks that are performed by the CPU 273 and/or GPU 275, such as the execution of operations and instructions of the various threads, processes and/or data flows executing across the plurality of processing units 270. That is, scheduler 260 determines which processor in the plurality of processors 270 will execute a program or portions of the program, to include mapping a handle in a program to a corresponding feature (e.g., function, object, data, etc.) depending on which processor is executing the program.

Heterogeneous computer system also includes one or more memory management units (MMUs) 230. A memory management unit is configured to handle accesses to memory 210 that are requested by the plurality of processors 270. As shown, MMU 230 may be configured as one unit for handling accesses by the plurality of processors 270, in one implementation. In another implementation, MMU 230 can be divided into one or more MMU subcomponents, each of which handle access to memory 210 for a particular processor, or a subset of processors. For instance, in one implementation a MMU subcomponent is included within each of the processors, and handles memory access for its corresponding processor.

In particular, the MMU 230 provides access to physical memory 210 through a virtual memory translation. Physical memory 210 includes executable code in memory locations 215 and 217, as well as data in memory locations 219 that is consistent with the Von Neumann architecture. Virtual memory is used to present a consistent type of memory to other components in the architecture of heterogeneous computer system 200. As shown, a plurality of virtual memories 250 is mapped to the physical memory 210, wherein each virtual memory corresponds to a particular processor. For instance, for each processor, the MMU 230 divides a corresponding virtual memory space (e.g., addresses) into pages. A plurality of page tables 235 corresponds to the plurality of processors 270, wherein a page table includes pages of virtual memory space for a particular processor. The address bits of a page comprises the virtual page number. Further, the MMU 230 translates virtual page numbers to physical page numbers in the physical memory 210. That is, an address or sequence of addresses in virtual memory is translatable to an address or sequence of addresses in physical memory 210.

In embodiments of the present invention, a handle (e.g., function pointer, pointer variable, etc.) of a program will call the proper function and/or data in physical memory 210, depending on the processor executing the program and/or function pointer of the heterogeneous computer system 200. Generally, dereferencing a function pointer calls executable code (e.g., function) or processor-specific read only data that is stored within memory 210. As an example, a function pointer comprises a variable containing the address to be called. Data located in memory 210 associated with the address contains processor-specific read only data or a processor specific function that is compiled for the corresponding processor.

The address contained within the function pointer is a virtual memory address. Also, the virtual memory address is universal for all the virtual memories associated with the plurality of processors 270 (e.g., to be in compliance with ISO C++ language requirements). Embodiments of the present invention are capable of translating the virtual memory address to the proper physical memory address that is dependent on the processor making the call to that address. For instance, because of different ISAs associated with the different processors, a function "foo" contained within a program may be compiled for processing by the CPU 273 as "foo_CPU" stored in memory location 215, as well as being compiled for processing by the GPU 275 as "foo_GPU" that is stored in memory location 217. Both functions "foo" have the same source code, but are compiled differently for processing by respective processors. As such, when CPU 273 makes a call for "foo," the function "foo_CPU" located at memory location 215 is called. Similarly, when the same program is executed by GPU 275, a call for "foo" results in a call for the function "foo_GPU" located at memory location 217.

More particularly, the proper address is called by translating the virtual memory address to the proper back end physical memory object for each processor, and more specifically for each ISA of processors in the heterogeneous computer system 200. That is, a plurality of page tables, corresponding to the plurality of virtual memories of system 200, is used to map the virtual memory location to a plurality of physical memory locations in physical memory 210 depending on which processor is referencing said virtual memory location. In one implementation, each page table corresponds to a different processor in the heterogeneous computer system 200.

Figure 3:
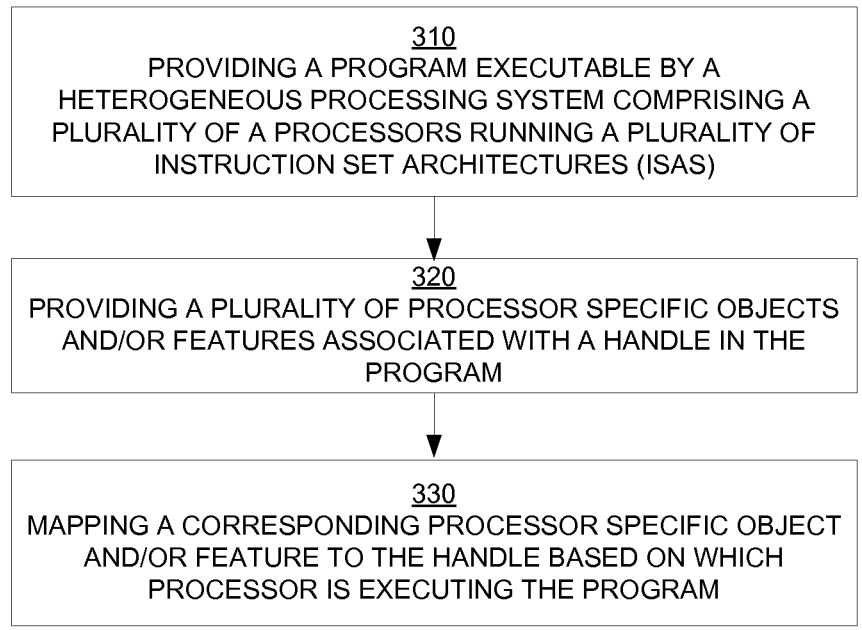
FIG. 3 is a flow diagram illustrating a method for program execution that is capable of implementing memory overlays for a handle that maps to a plurality of processor specific features depending on which processor of a heterogeneous processing system is executing the program, in accordance with one embodiment of the present disclosure.

FIG. 3 is a flow diagram 300 illustrating a method for program execution that is capable of implementing memory overlays for a handle that maps to a plurality of processor specific objects and/or features depending on which processor of a heterogeneous processing system is executing the program, in accordance with one embodiment of the present disclosure. In another embodiment, flow diagram 300 is implemented within a computer system including a processor and memory coupled to the processor and having stored therein instructions that, if executed by the computer system causes the system to execute a method for program execution that is capable of implementing memory overlays for a handle that maps to a plurality of processor specific objects and/or features depending on which processor of a heterogeneous processing system is executing the program. In still another embodiment, instructions for performing a method are stored on a non-transitory computer-readable storage medium having computer-executable instructions for causing a computer system to perform a method for program execution that is capable of implementing memory overlays for a handle that maps to a plurality of processor specific objects and/or features depending on which processor of a heterogeneous processing system is executing the program. The method outlined in flow diagram 300 is implementable by one or more components of the computer system 100 and 200 of FIGS. 1 and 2, respectively.

At 310, the method includes providing a program executable by a heterogeneous processing system. The system includes a plurality of processors running a plurality of ISAs. For instance, each processor runs a different ISA, including machine language, for processing programs and/or functions.

At 320, the method includes providing a plurality of processor specific objects and/or features, each of which is associated with a handle in the program. In one embodiment, the processor specific objects and/or features include functions. In another embodiment, the processor specific objects and/or features include data.

At 330, the method includes mapping and/or translating a corresponding processor specific object and/or feature to the handle. More specifically, as the program is being executed, processor specific objects and/or features are called and/or implemented through a handle in the program. For instance, in the heterogeneous processing system, a first processor specific object and/or feature is exposed when the handle is processed by a first processor. Correspondingly, a second processor specific object and/or feature is exposed when the same handle is processed by a second processor.

In one embodiment, the processor specific feature is exposed by dereferencing the handle. In one implementation, the handle comprises a function pointer, such that dereferencing the function pointer exposes the processor specific feature, depending on which processor is executing the program. For instance, dereferencing the handle includes translating a virtual memory location that is associated with the handle. As an example, where the handle comprises a function pointer, the virtual memory location is included or stored in the function pointer as a variable. As such, when dereferencing the function pointer, the virtual memory location is mapped to a physical memory location depending on which processor is executing the program and handle. The physical memory location stores the processor specific object and/or feature, such as, a function, data, etc. In that manner, the processor specific feature is called when executing the program, and more specifically when processing the handle, or function pointer within the program. When the processor specific object and/or feature comprises a processor specific function, dereferencing the function pointer calls the function. Also, when the processor specific object and/or feature comprises processor specific data, processing the handle calls and/or accesses the data.

FIG. 4 is a flow diagram 400 illustrating a computer implemented method for program execution that is capable of implementing code memory overlays for a portable function pointer that has a unique address in a plurality of virtual memories of a heterogeneous processing system, such that the address is translatable to different executable objects corresponding to each ISA of processors in the heterogeneous computer system executing the program including the pointer variable, in accordance with one embodiment of the present disclosure. In another embodiment, flow diagram 400 is implemented within a computer system including a processor and memory coupled to the processor and having stored therein instructions that, if executed by the computer system causes the system to execute a method for program execution that is capable of implementing code memory overlays for a portable function pointer that has a unique address in a plurality of virtual memories of a heterogeneous processing system. In still another embodiment, instructions for performing a method are stored on a non-transitory computer-readable storage medium having computer-executable instructions for causing a computer system to perform a method for program execution that is capable of implementing code memory overlays for a portable function pointer that has a unique address in a plurality of virtual memories of a heterogeneous processing system. The method outlined in flow diagram 400 is implementable by one or more components of the computer system 100 and 200 of FIGS. 1 and 2, respectively.

In one embodiment, flow diagram 400 provides a specific implementation of flow diagram 300 for implementing code memory overlays through a handle that comprises a function pointer, wherein the function pointer includes a unique virtual memory address that is mappable to a plurality of processor specific functions. That is, flow diagram 400 is implemented to call processor specific functions through a function pointer in a program.

In another embodiment, the operations performed in flow diagram 400 are implemented by one or more of the processors in a heterogeneous computer system. That is, the same program may exercise the operations concurrently on any or all processors in the heterogeneous system.

At 410, the method includes providing a program executable by a heterogeneous processing system. The system includes a plurality of processors running a plurality of instruction set architectures (ISAs). For instance, each processor runs a different ISA, including machine language, for processing programs and/or functions.

At 420, the method includes providing a plurality of processor specific functions. That is, each function is executable by a corresponding processor, but not necessarily by another processor in the heterogeneous processing system. For instance, a function as written may be executable by a corresponding ISA of a processor, and is not executable by another other ISAs. Further, the plurality of processor specific functions is stored in a plurality of physical memory locations. As an example, each memory location includes a particular function. As such, a particular processor is able to access and/or execute a corresponding and compatible processor specific function by accessing the proper memory location.

At 430, the method includes executing a program by a first processor in the plurality of processors. For instance, the program or portions of the program is scheduled by a scheduler for execution by the first processor at a particular moment in time. The scheduler chooses which processor will execute the program from all processors that are capable of executing the program. In this manner, the heterogeneous system is able to maximize utilization of its processing power, for instance, by spreading execution of the program or portions of the program across one or more threads of processors.

At 440, the method includes dereferencing the function pointer to a corresponding processor specific function. For instance, the program includes a function pointer that when dereferenced makes a call to a processor specific function or processor-specific read only data in memory. As such, as the program is executed, a jump is made to access the processor specific function, in one embodiment, or to access read only data that is processor specific in another embodiment.

In particular, when dereferencing the function pointer, the method includes translating a virtual memory location stored in the function pointer. For instance, the function pointer includes a virtual memory address that is universal to the plurality of processors. In one implementation, the virtual memory address is included as a variable in the function pointer. The virtual memory address is universal to each of the virtual memories associated with the plurality of processors in the heterogeneous processing system. The address can be taken using the "&" operator, in one implementation.

When the function pointer is dereferenced, such as, when using the "*" operator, the processor specific function or processor-specific read only data whose address was taken is called. That is, at 450, the method includes accessing a first memory location that is in relation to the first processor. As such, because the first processor is making the call, when the pointer variable is called or dereferenced, translation of the virtual memory address is performed using the page tables associated with the first processor. In that manner, the proper first physical memory location is accessed.

In one embodiment, the processor specific function is stored in the first physical memory location. As such, a first function is called when the first processor is executing the function pointer. For instance, translation of the virtual memory address to the first physical memory location is performed using page tables associated with the first processor.

On the other hand, if a second processor is dereferencing the function pointer, then a different memory location is accessed. For instance, the program may be executed independently by the second processor, or may be executing another portion of the program wherein the function pointer is dereferenced. More particularly, the method includes a second processor executing the program, or portions of the program, wherein the function pointer is dereferenced, or dereferenced again. The same virtual memory address is translated from the function pointer to a second physical memory location. As such, because the second processor is dereferencing the function pointer, translation of the virtual memory address is performed using the page tables associated with the second processor. In that manner, the proper second physical memory location is accessed in relation to the second processor. Specifically, a processor specific second function is called at the second physical memory location in one embodiment, or processor specific second data is accessed at the second physical memory location in another embodiment, when the second processor is executing the program and/or dereferencing the pointer.

Figure 5A:
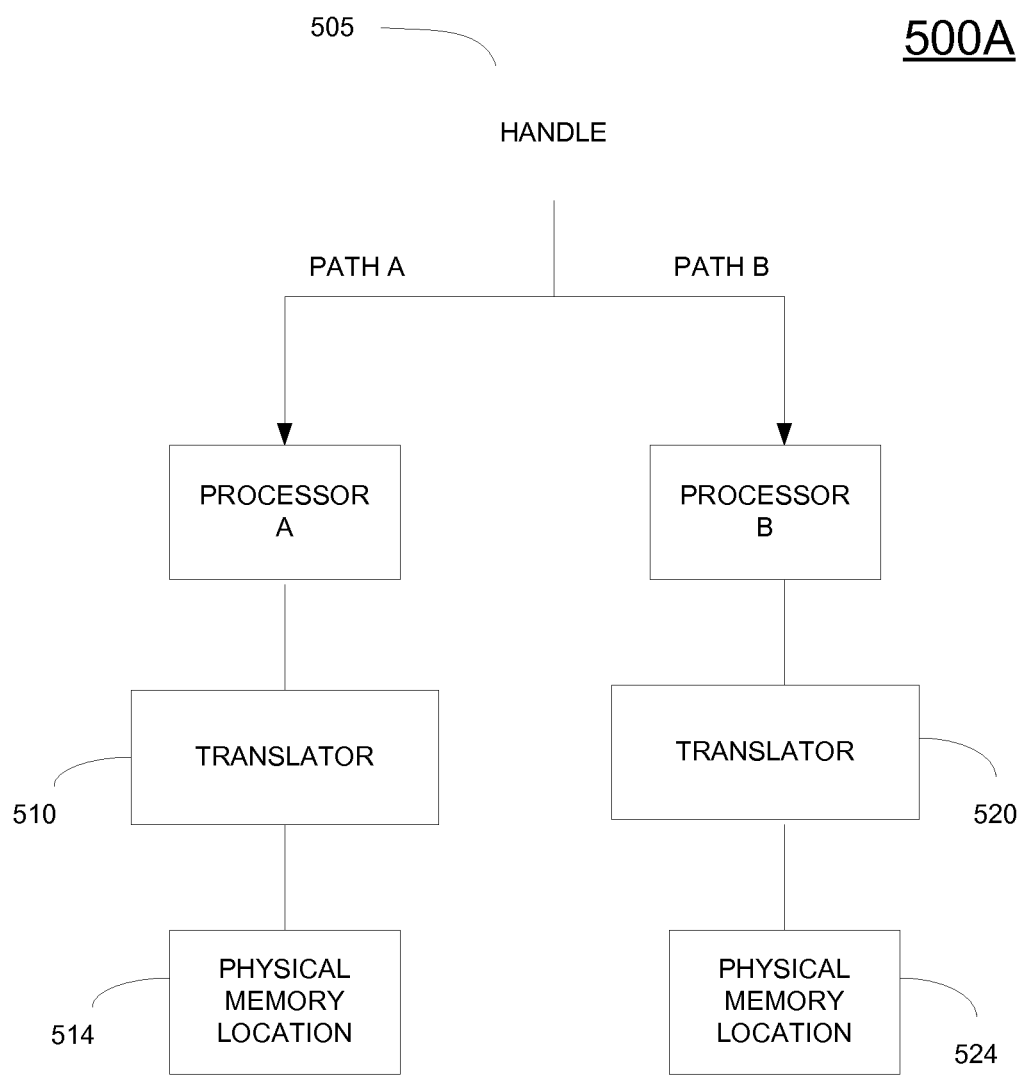
FIG. 5A is a process flow illustrating the translation of a handle that is used heterogeneously among a plurality of processors to translate and/or map to an object and/or feature that is processor or ISA specific, in accordance with one embodiment of the present disclosure.

FIG. 5A is a process flow illustrating the translation of a handle 505 that is used heterogeneously among a plurality of processors for translating and/or mapping to an object and/or feature that is processor or ISA specific, in accordance with one embodiment of the present disclosure. The processors in the heterogeneous processing system may include CPUs, GPUs, digital signal processors (DSPs), etc. and include any combination of processors that implement Von Neumann architectures. Further, each of the processors implement virtual memory, as implemented through separate virtual memory mappings.

The heterogeneous processing system is able to execute a program, or a subset of a program that includes a handle (e.g., function pointer, pointer variable, etc.) that is translatable to an executable object and/or feature once for each ISA in the heterogeneous processing system. For instance, a program includes a handle 505 that is accessed or used by processors in a heterogeneous processing system. More particularly, when accessing or using handle 505, the operating system loader is configured such that, instead of mapping the same object and/or feature (e.g., executable function or data) into memory for all processors at the same virtual address (N times), each processor maps a different object and/or feature (e.g., processor specific executable function or processors specific data) into the same virtual address (once).

As an example, if processor A 510 is scheduled to execute the program, and more particularly the portion of the program that includes handle 505 in FIG. 5A, then Path A is taken. As such, the translator 510 translates the handle 505 to a physical memory location 514 that is associated with processor A. The physical memory location 514 includes the executable object and/or feature (e.g., functions, data, etc.) associated with processor A. As such, an object and/or feature specific to processor A and included in physical memory location 514 is translated or mapped using handle 505.

On the other hand, if processor B is scheduled to execute the program, and more particularly the portion of the program that includes handle 505, then Path B is taken. As such, translator 520 translates handle 505 to a physical memory location 524 that is associated with processor B. In that manner, the same handle 505 is translated to different physical memory locations depending on which processor is executing the portion of the program that includes handle 505. The physical memory location 524 includes the executable object and/or feature (e.g., functions, data, etc.) associated with processor B. As such, an object and/or feature specific to processor B and included in physical memory location 524 is translated or mapped using handle 505.

Figure 5B:
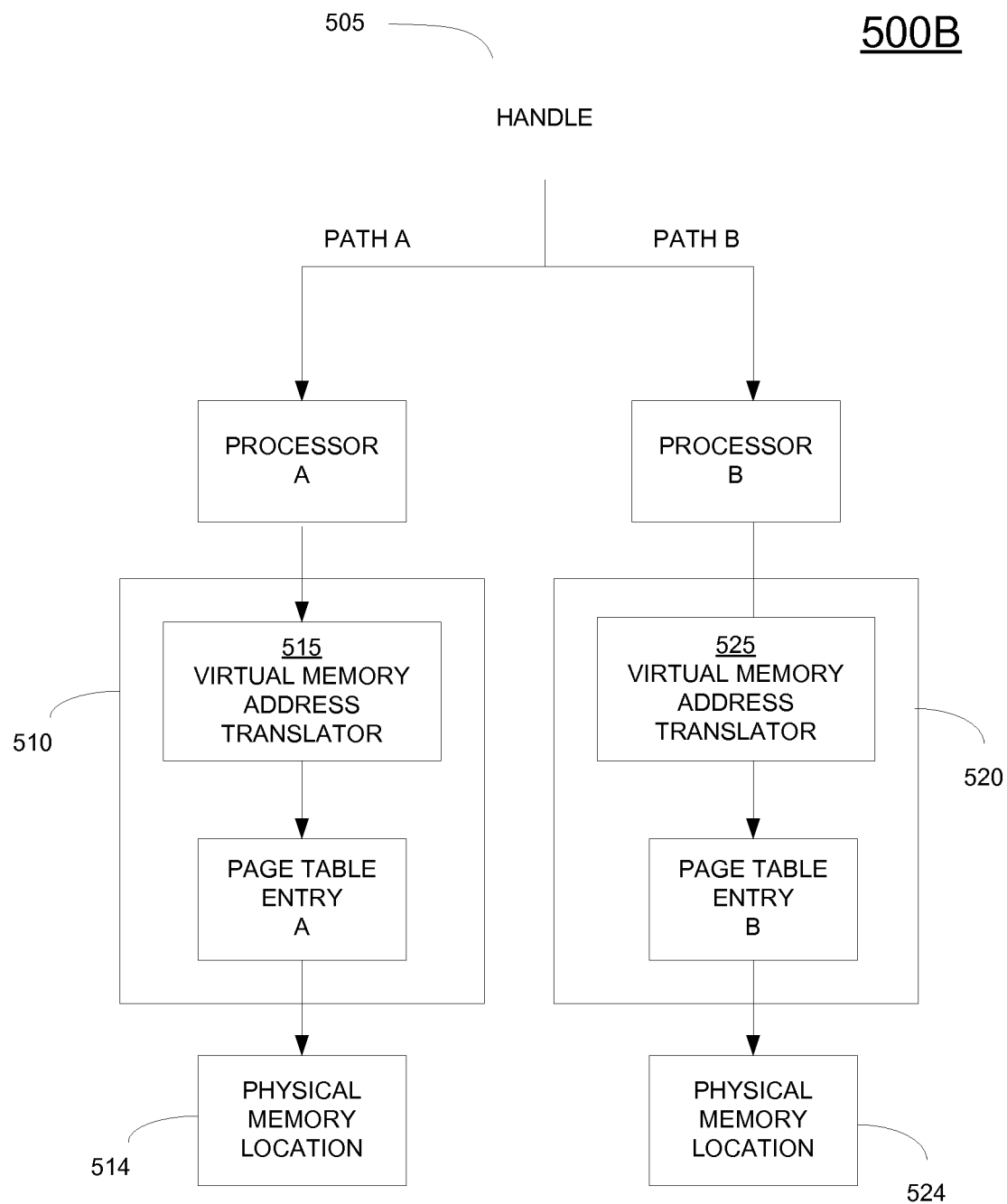
FIG. 5B is a process flow illustrating the translation of a handle including a virtual memory address that is used heterogeneously among a plurality of processors to translate and/or map to an object and/or feature that is processor or ISA specific, in accordance with one embodiment of the present disclosure.

FIG. 5B is a process flow illustrating the translation of a handle that is used heterogeneously among a plurality of processors for translating and/or mapping to an object and/or feature that is processor or ISA specific through the use of page tables and virtual memory, in accordance with one embodiment of the present disclosure. In particular, FIG. 5B is one implementation of the translators 510 and 520. As initially described in FIG. 5A, if processor A is scheduled to execute the program, then PATH A is taken. As such, the virtual memory address translator 515 within translator 510 translates the virtual memory address included in handle 505. For instance, translation of the virtual memory address is performed by a MMU using page table entry A that is associated with processor A. As such, the virtual memory address included in handle 505 is translated to physical memory location 514 that contains object and/or features (e.g., function, data, etc.) that is specific for processor A. That is, an object and/or feature specific to processor A and included in physical memory location 514 is mapped using the virtual address of handle 505.

On the other hand, if processor B is scheduled to execute the program, then PATH B is taken. As such, the virtual memory address translator 525 within translator 520 translates the virtual memory address included in the same handle 505. Translation of the virtual memory address is performed by a MMU using page table entry B that is associated with processor B. As such, the virtual memory address is translated to physical memory location 524 that contains the object and/or feature (e.g., function, data, etc.) specific for processor B. That is an object and/or feature specific to processor B and included in physical memory location B 580 is mapped using the virtual address of P 505.

In some embodiments, the processors A and B of FIGS. 5A and 5B are logical processors, translators 510 and 520 are logical translators, and the virtual memory address translators 515 and 525 are logical virtual memory address translators. Physical processors and logical virtual address translators may be arranged differently in other embodiments.

Figure 6:
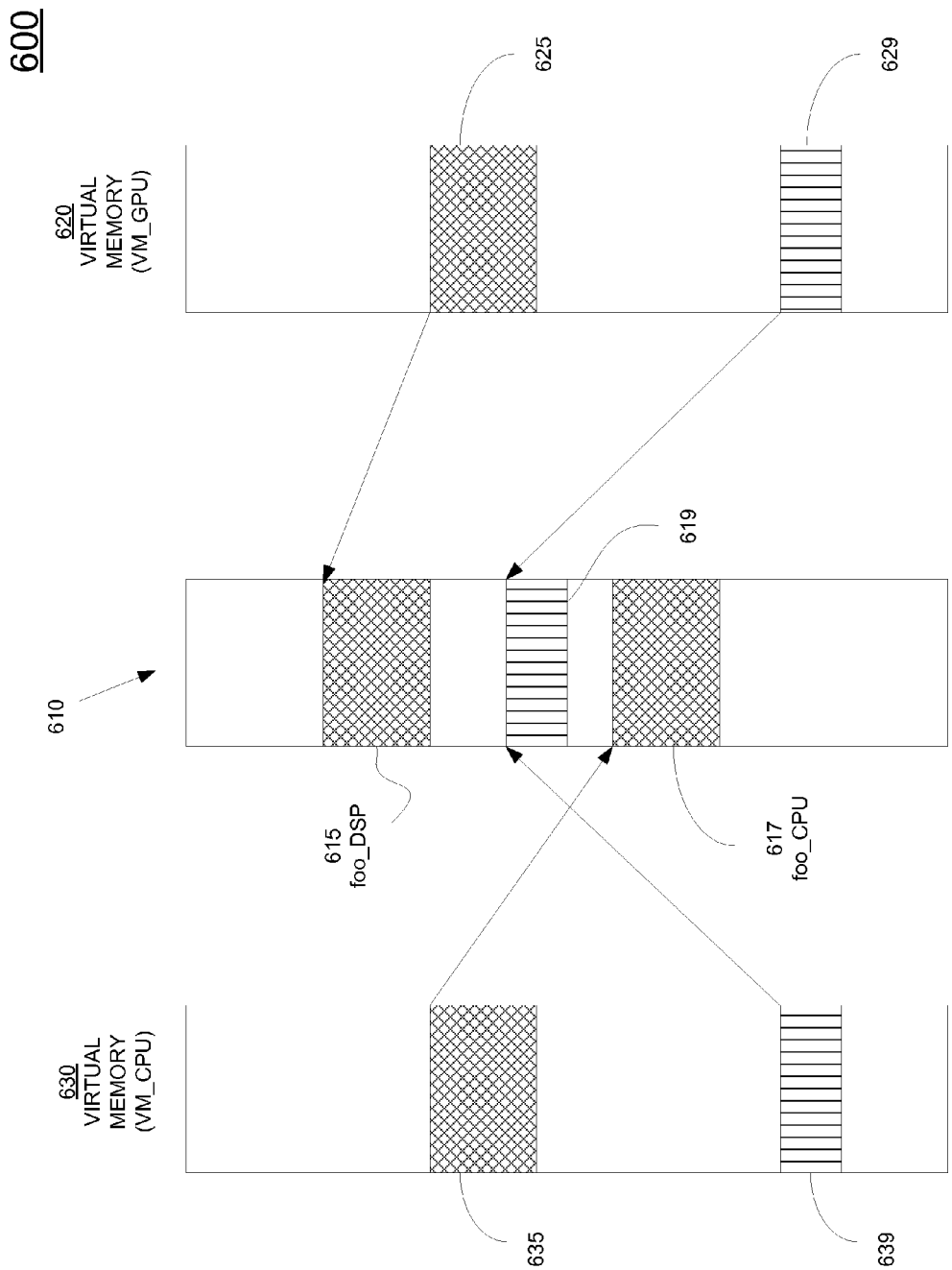
FIG. 6 is a diagram illustrating the storing of processor specific functions that are called through a pointer variable including a virtual address that is universal amongst a plurality of virtual memories in a heterogeneous processing system, in accordance with one embodiment of the present disclosure.

FIG. 6 is a diagram 600 illustrating the storing of processor specific objects and/or features functions that are called through a handle including a virtual address that is universal amongst a plurality of virtual memories in a heterogeneous processing system, in accordance with one embodiment of the present disclosure. For instance, FIG. 6 illustrates the storing of processor specific functions that are called through a function pointer that includes a universal virtual address, in one embodiment. In particular, a virtual memory address of a function pointer is translatable to different objects and/or features corresponding to each ISA of the processors in the heterogeneous computer system that is executing the program including the function pointer.

As shown in FIG. 6, the memory system includes physical memory 610 and one or more virtual memories. Each instantiation of virtual memory is associated with a different processor, in one embodiment. For instance, virtual memory for a GPU (VM_GPU) 620 is implemented by the GPU and is mapped to main physical memory 610 through a corresponding page table. Also, virtual memory for a CPU (VM_CPU) 630 is implemented by the CPU and is mapped to main physical memory 610 through its corresponding page table. It is important to note that the page tables for the CPU and GPU are different.

Main or physical memory includes both executable code (e.g., functions) and data. For illustration, data is stored in memory location 619. In addition, processor specific functions "foo" are stored in main memory 610. The function "foo" has the same source code, but is compiled for execution by different processors having different ISAs. For instance, memory location 615 includes "foo" compiled for the GPU (foo_GPU) that is called using a pointer variable. Also, memory location 617 includes "foo" compiled for the CPU (foo_CPU) that is also called using the same function pointer. For clarity and illustration, main memory 610 may include other data and other executable code, but are not shown.

In particular, VM_GPU 620 includes virtual memory location 629 for storing data. Through page tables associated with the GPU, virtual memory location 629 is translated to memory location 619 in main memory 610. Further, the same data included in location 619 is also referenced by the CPU. That is, VM_CPU includes a virtual memory location 639 for storing the same data. In one embodiment, the virtual memory locations for the data in virtual memory for the GPU and the CPU are the same. In other words, given virtual memory space for the CPU and GPU that are similar, the virtual memory address locations in the CPU and GPU are identical for storing and referencing the same data physically stored in location 619 of main memory 610.

Executable code is treated differently. As shown in FIG. 6, VM_GPU 620 includes virtual memory location 625 for storing executable code. Through page tables associated with the GPU, virtual memory location 625 is translated to memory location 615 in main memory 610 that stores executable code "foo_GPU." In one embodiment, the executable code "foo_GPU" is called through a function pointer. As such, a program including the function pointer executed by the GPU will call "foo_GPU," wherein "foo GPU" is compiled for execution by the GPU.

On the other hand, VM_CPU 630 includes virtual memory location 635 for storing a representation of the same executable code, such as, function "foo." In one embodiment, the address for virtual memory location 635 for the CPU is the same address for virtual memory location 625 for the GPU, where both the GPU and the CPU are calling a function "foo" through the same function pointer. Though "foo" is the same function included in the program and is called using the same function pointer, different executable code for "foo" (e.g., "foo_GPU" and "foo_CPU") is called depending on the processor executing the program and making the call through the pointer variable. Differentiation is implemented through the page tables of the respective processor. In the case of the CPU, through page tables associated with the CPU, virtual memory location 635 is translated to memory location 617 in main memory 610 that stores executable code "foo_CPU."

As shown in FIG. 6, each processor (e.g., GPU and CPU) maps a different executable object in the same virtual address that is universal for all the virtual memories in the heterogeneous processing system. That is, a pointer variable called by the GPU in a program will call the function "foo_GPU" stored in memory location 615. The same pointer variable called by the CPU will call function "foo_CPU" that is stored in a different memory location 617. Both functions "foo" are represented by the same source code, but are compiled for execution by their respective processors. For illustration, function "foo_GPU" stored in memory location 615 is not executable by the CPU.

Also shown in FIG. 6, the size of the virtual memory spaces associated with a function pointer is similar. That is, the size or space of the virtual memory locations 635 and 625 are similar. Furthermore, the corresponding physical memory locations 615 and 617 are similar to the size or space of the virtual memory locations 635 and 625. In one embodiment, the size of the virtual and physical memory locations are equally sized to the largest memory space required by the plurality of processors when calling a function or processor specific read only data. That is, the objects and/or features stored in the main memory, as called by the function pointer, are of the same size for each ISA, such that each contains the same number of symbols. Also, each symbol has the same size for each ISA. For example, symbols in an ISA that are shorter than the maximum sized symbol are noop-extended or interrupt-extended.

Figure 7A:
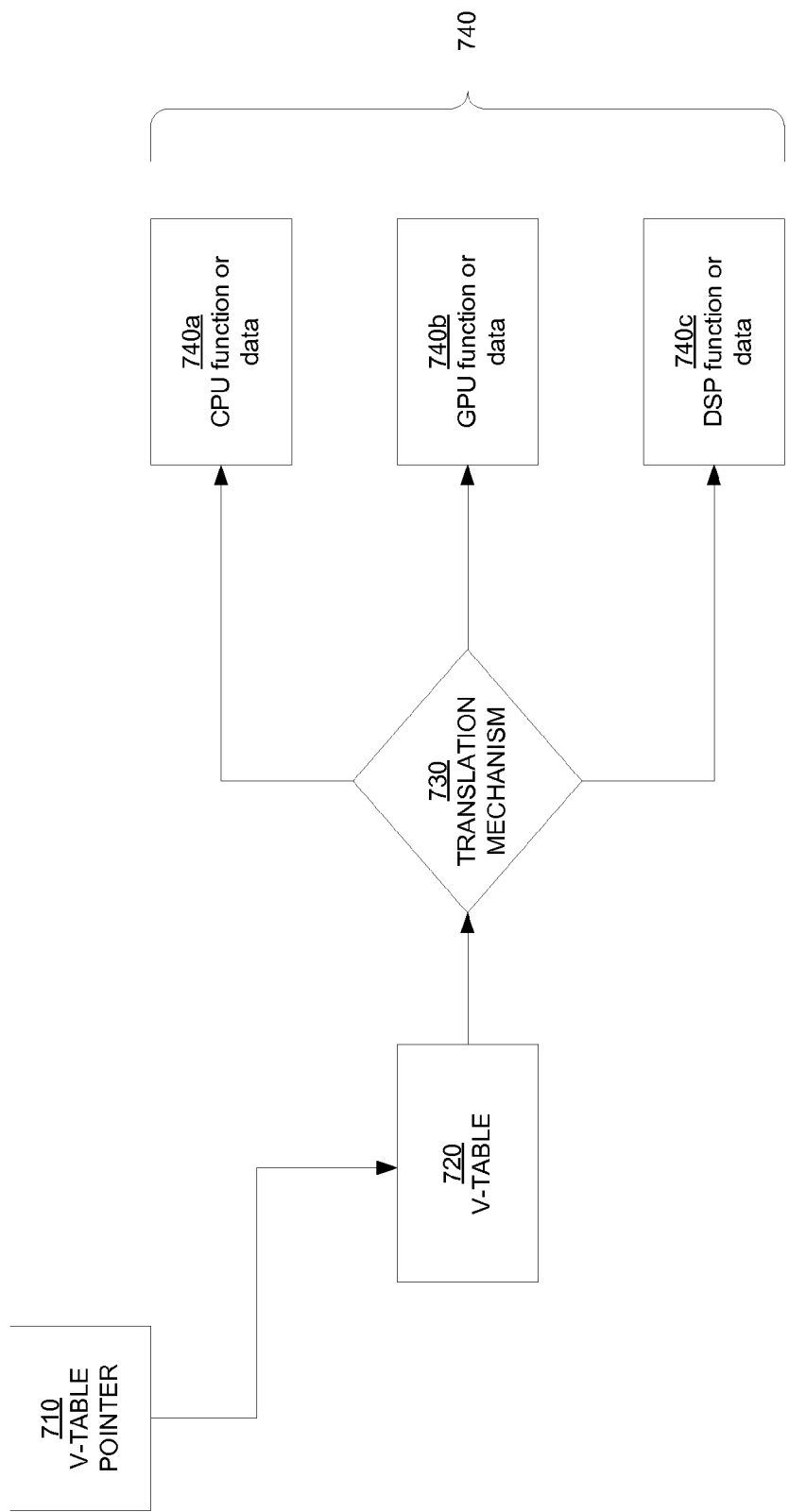
FIG. 7A is a flow diagram illustrating the translation of a virtual table that is mapped universally among a plurality of processors with translation and/or mapping to a function that is processor or ISA specific, in accordance with one embodiment of the present disclosure.

FIG. 7A is a process flow diagram 700A illustrating the translation of a virtual table (v-table) 720 that is mapped universally among a plurality of processors with translation and/or mapping to a function that is processor or ISA specific, in accordance with one embodiment of the present disclosure. The heterogeneous processing system is able to execute a program, or a subset of a program that includes a v-table pointer 710 that is translatable to an executable object and/or feature once for each ISA in the heterogeneous processing system. The v-table pointer 710 points to a virtual table 720 that is universal to the heterogeneous processing system. Translation mechanism 730 within the processing system executing the program operates to translate the v-table 720 to a processor specific function. For instance, translation of the v-table 720 may be performed using function/data translation tables, wherein each table is associated with a corresponding processor. As such, the v-table 720 is translated to a processor specific function and/or data in the plurality of objects 740. For instance, if a CPU processor is executing the program, then translation mechanism 730 calls CPU function and/or data 740a. Also, if a GPU processor is executing the program, then translation mechanism 730 calls GPU function and/or data 740b. Additionally, if a DSP processor is executing the program, then translation mechanism 730 calls DSP function and/or data 740c. Other processors may be included to call corresponding processor specific functions and/or data. In that manner, a processor specific function and/or data is mapped using the v-table 720 associated with v-table pointer 710. In one embodiment, the functions called are virtual functions.

Figure 7B:
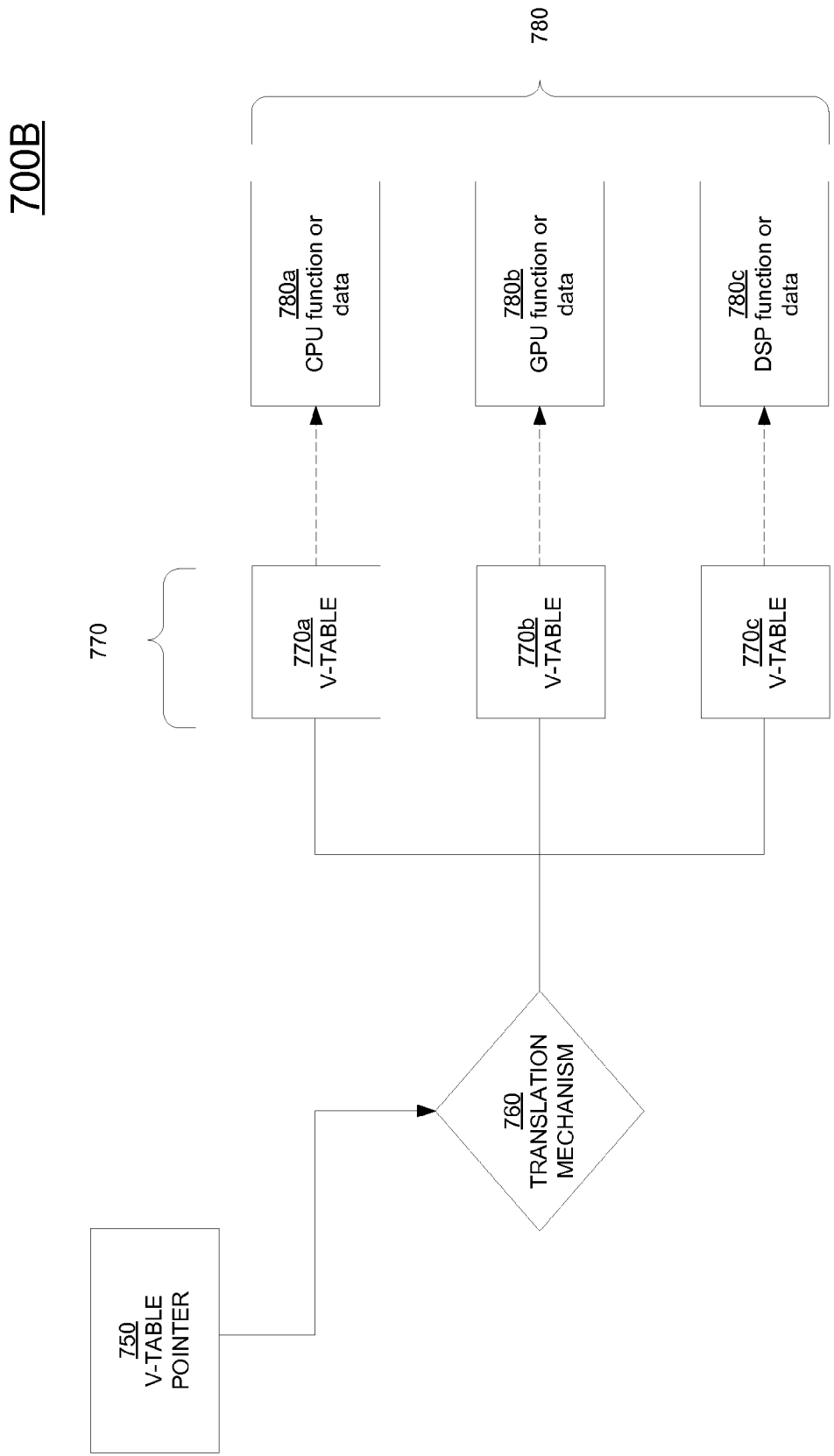
FIG. 7B is a process flow diagram illustrating the translation of a virtual table pointer that is mapped differently among a plurality of processors with translation and/or mapping to data that is processor or ISA specific, in accordance with one embodiment of the present disclosure.

FIG. 7B is a process flow diagram 700B illustrating the translation of a virtual table (v-table) that is mapped differently among a plurality of processors with translation and/or mapping to data that is processor or ISA specific, in accordance with one embodiment of the present disclosure. Specifically, a heterogeneous processing system is able to execute a program, or a subset of a program that includes a v-table pointer 750 that is translatable to function and/or data once for each ISA in the heterogeneous processing system. The v-table pointer 750 is used by a translation mechanism of a corresponding processor to point to a particular v-table in the plurality of v-tables 770. That is, the v-tables in the plurality of v-tables 770 are processor specific. As such, depending on which processor is executing the portion of the program including the v-table pointer 750, the translation mechanism 760 will translate and/or map the v-table pointer 750 to a corresponding v-table. For instance, if a CPU processor is executing the program, then translation mechanism 760 will map the v-table pointer 750 to a processor specific v-table 770a, which leads to or contains CPU function and/or data 780a. Also, if a GPU processor is executing the program, then translation mechanism 760 will map the v-table pointer 750 to a processor specific v-table 770b, which leads to or contains GPU function and/or data 780b. Additionally, if a DSP processor is executing the program, then translation mechanism 760 will map the v-table pointer 750 to a processor specific v-table 770c, which leads to or contains DSP function and/or data 780c. Other processors may be included to call corresponding processor specific functions and/or data. In that manner, a processor specific function and/or data is mapped using the v-table pointer 750. In one embodiment, the functions called are virtual functions.

In another embodiment, the objects and/or features (executable function or processor specific read only data) are matched with trampoline objects for every other ISA. A trampoline object is an object which contains only trampoline symbols. A trampoline symbol is one which targets only a single instruction, an unconditional jump to another address, which in this case is the address of the same symbol in the non-trampoline object compiled for that ISA.

Thus, according to embodiments of the present disclosure, systems and methods are described implementing memory overlays for a portable handle (e.g., function pointer, pointer variable, etc.) having a unique address in a plurality of virtual memories of a heterogeneous processing system.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the present disclosure are thus described. While the present disclosure has been described in particular embodiments, it should be appreciated that the disclosure should not be construed as limited by such embodiments, but rather construed according to the below claims.

The invention claimed is:

1. A method for program execution, comprising:
providing a program executable by a heterogeneous processing system comprising a plurality of a processors running a plurality of instruction set architectures (ISAs);
providing a plurality of processor specific functions;
executing said program by a first processor, wherein said program comprises a function pointer; and
dereferencing said function pointer comprising a virtual memory location in a virtual table by mapping said function pointer to a corresponding processor specific function in a plurality of page tables based on which processor in said plurality of processors is executing said program without using processor specific tags, wherein said virtual memory location is mapped using a first page table when processed by said first processor and is mapped using a second page table when processed by a second processor, wherein said function pointer and virtual memory locations in said virtual table are universal to said plurality of processors, and wherein each processor is associated with a unique set of one or more page tables.

2. The method of claim 1, wherein said dereferencing said function pointer comprises:
mapping said virtual memory location stored in said function pointer to a first physical memory location in relation to said first processor, wherein said virtual memory location is universal for said plurality of processors.

3. The method of claim 2, wherein said mapping said virtual memory location comprises:
calling a first function stored at said first physical memory location.

4. The method of claim 2, further comprising:
mapping said virtual memory location to a second physical memory location in relation to said second processor executing said program.

5. The method of claim 2, wherein said mapping a virtual memory location comprises:
translating said virtual memory location to said first physical memory location using a page table associated with said first processor.

6. The method of claim 1, further comprising:
equally sizing memory space for each of a plurality of physical memory locations corresponding to said virtual memory location in relation to said plurality of processors to a largest size required by said plurality of processors when calling a function or processor specific read only data in relation to said referencing said virtual memory location.

7. A heterogeneous processing system, comprising:
physical memory;
a plurality of processors in said heterogeneous processing system each configured to execute a program, wherein said plurality of processors run a plurality of instruction set architectures (ISAs);
a virtual memory corresponding to said plurality of processors, wherein a pointer variable in said program includes a virtual memory location of a virtual table that are both universal to said plurality of processors;
a plurality of page tables for mapping said virtual memory location to a plurality of physical memory locations in said physical memory depending on which processor is referencing said virtual memory location without using processor specific tags, wherein said virtual memory location is mapped using a first page table when processed by a first processor and is mapped using a second page table when processed by a second processor, wherein each processor is associated with a unique set of one or more page tables, wherein each of said plurality of physical memory locations is at least of a first size that comprises a largest memory space required by one of said plurality of processors when calling said pointer variable.

8. The heterogeneous processing system of claim 7, further comprising:
said first processor calling said pointer variable when executing said program;
a first physical memory location determined from said first page table corresponding to said first processor;
said second processor calling said pointer variable when executing said program; and
said second physical memory location determined from said second page table corresponding to said second processor.

9. The heterogeneous processing system of claim 8, further comprising:
  a first function stored at said first physical memory location, wherein said pointer variable comprises a function pointer variable, wherein said first processor executes said first function when calling said function pointer variable.

10. The heterogeneous processing system of claim 9, further comprising:
  a second function stored at said second physical memory location, wherein said pointer variable comprises a function pointer variable, wherein said second processor executes said second function when calling said function pointer variable.

11. The heterogeneous processing system of claim 8, further comprising:
  first processor specific read only data stored at said first physical memory location, wherein said first processor accesses said first processor specific read only data when accessing said function pointer variable; and
  second processor specific read only data stored at said second physical memory location, wherein said second processor accesses said second processor specific read only data when accessing said function pointer variable.

12. The heterogeneous processing system of claim 7, wherein each of said plurality of physical memory locations is equally sized to the largest memory space required by said plurality of processors when calling a function or processor specific read only data in relation to said referencing said virtual memory location.

13. The heterogeneous processing system of claim 7, further comprising:
  a memory mapping unit for mapping said virtual memory location to said plurality of physical memory locations in said physical memory based on said plurality of page tables.

14. A method for program execution, comprising:
  providing a program executable by a heterogeneous processing system comprising a plurality of a processors running a plurality of instruction set architectures (ISAs);
  providing a plurality of processor specific features associated with a handle in said program, wherein said handle comprises a function pointer to a virtual memory location in a virtual table; and
  mapping a corresponding processor specific feature to said handle based on which processor is executing said program without using processor specific tags, wherein said virtual memory location is mapped using a first page table when processed by a first processor and is mapped using a second page table when processed by a second processor, wherein said function pointer and said virtual table are universal to said plurality of processors, and wherein each processor is associated with a unique set of one or more page tables.

15. The method of claim 14, further comprising:
  executing said program by said first processor; and
  exposing a first processor specific feature when executing said handle by said first processor.

16. The method of claim 15, wherein said exposing a first processor specific feature comprises dereferencing said handle.

17. The method of claim 16, wherein said dereferencing said handle comprises:
  translating said virtual memory location stored in said function pointer, wherein said virtual memory location is universal for said plurality of processors; and
  accessing a physical memory location in relation to said first processor, wherein said physical memory location stores said first processor specific feature comprising a function.

18. The method of claim 15, further comprising:
  executing said program by said second processor; and
  exposing a second processor specific feature when executing said handle by said second processor.

19. The method of claim 18, wherein said exposing a second processor specific feature further comprises:
  translating said virtual memory location stored in said handle, wherein said virtual memory location is universal for said plurality of processors; and
  accessing a physical memory location in relation to said second processor, wherein said physical memory location stores said second processor specific feature comprising a function, wherein said plurality of processor specific features is stored in a plurality of physical memory locations.

20. The method of claim 14, wherein said providing a plurality of processor specific features comprises providing a plurality of processor specific data, and wherein said mapping a corresponding processor specific feature comprises mapping a corresponding data to said handle.

* * * * *